(12) United States Patent
Chou et al.

(10) Patent No.: US 8,782,773 B2
(45) Date of Patent: Jul. 15, 2014

(54) FRAMEWORK FOR COMMUNICATING ACROSS A FIREWALL

(75) Inventors: Wu Chou, Basking Ridge, NJ (US); Lookman Yasin Fazal, Franklin Park, NJ (US); Weiping Guo, Piscataway, NJ (US); Feng Liu, Hillsborough, NJ (US); Zhi Qiang Zhao, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 880 days.

(21) Appl. No.: 12/570,848

(22) Filed: Sep. 30, 2009

(65) Prior Publication Data

US 2011/0078781 A1    Mar. 31, 2011

(51) Int. Cl.
*G06F 21/00* (2013.01)
(52) U.S. Cl.
USPC ........ 726/15; 726/3; 726/11; 726/12; 726/28; 713/152; 709/229; 370/310; 370/352; 370/328
(58) Field of Classification Search
USPC ...................................... 726/11, 15; 709/229
See application file for complete search history.

(56) References Cited

U.S. PATENT DOCUMENTS 7,509,673 B2 * 3/2009 Swander et al. ................ 726/11
2004/0049702 A1 * 3/2004 Subramaniam et al. ...... 713/201

OTHER PUBLICATIONS

"A Group Signature Based Secure and Privacy-Preserving Vehicular Communication Framework";Jinhua Guo et al; Department of Computer and Information Science, University of Michigan-Dearborn; Mobile Networking for Vehicular Environments, 2007.*

* cited by examiner

*Primary Examiner* — Jason Lee
(74) *Attorney, Agent, or Firm* — Maldjian Law Group LLC; John Maldjian; Alexander D. Walter

(57) ABSTRACT

A system for enabling communication between a first domain and a second domain is disclosed. At least the first domain is protected by a firewall. A first data-processing system is provided in the first domain and a second data-processing system provided in second domain. The second domain hosts an application that the first domain desires to access. To enable the communication between the two domains a tunnel is established through the firewall. The tunnel runs from the first data-processing system to the second data-processing system. The second data-processing system provides a web-proxy interface to interface to the application and also acts as a tunnel gateway.

9 Claims, 7 Drawing Sheets

Telecommunications System 100

FRAMEWORK FOR COMMUNICATING ACROSS A FIREWALL

FIELD OF THE INVENTION

The present invention relates to telecommunication systems in general, and, more particularly, to a framework for communicating across a firewall.

BACKGROUND OF THE INVENTION

Telecommunication systems have changed the way business is conducted. These systems have made it possible to access applications without regard to the physical location of those applications. The ability to remotely-access applications has prompted the migration of complicated applications, such as, voice applications, internet telephony, client management, etc., to remote locations. This provides cost, management, maintenance and other advantages.

There are a number of methods for distributing, accessing and integrating applications. Software as a Service (SaaS) is one such method. SaaS is a model in which a first domain accesses an application that is hosted in a second domain. Or, the application hosted in the second domain accesses the resources of the first domain. For example, a text-processing application could be hosted in the second domain and a text file could be edited using that application but without having to install it in the first domain. Also, the text processing application could control a display located in the first domain for displaying the text file that is being edited. For these models to function properly, it is of the utmost importance that the first and the second domains communicate effectively with each other.

Often, one or more of the domains are protected by a firewall. A firewall is a part of a computer system or network designed to block unauthorized access while permitting authorized communications. Maintaining uninterrupted communication between domains, wherein at least one of the domains is protected by a firewall, becomes a complex issue.

One way to enable uninterrupted communication with a firewall-protected domain is to "poke a hole" in the firewall. A hole can be poked through a firewall by opening a port through the firewall. But doing so defeats the purpose of the firewall because the hole exposes the otherwise protected domain to external threats. Furthermore, poking holes in the firewall requires additional burden of configuring the firewall according to the holes. Another way to enable uninterrupted communication is to establish a "tunnel" that runs from one domain to another domain across the firewall/s. In this solution, each application requires its own tunnel for communications. A large number of applications require a large number of tunnels. Managing a large number of tunnels is complex and ultimately affects the integrity of a firewall. This approach, therefore, becomes unworkable if many applications are being accessed by a domain or the application is being accessed by multiple domains.

SUMMARY OF THE INVENTION

The present subject matter provides a telecommunication system without some of the disadvantages of the prior art.

Inter-domain communications have traditionally required a large number of tunnels for accessing applications through firewalls. One reason for this is that each application hosted in the second domain recognizes only certain types of communications channels and/or runs on only specific platforms. By addressing this specific issue, the present invention reduces the number of tunnels required to access multiple applications. In particular, the illustrative embodiment provides a way for an application to generate signals that can be communicated over a commonly-available network (e.g., the Internet, etc.). This is achieved by providing a second data-processing system in the second domain. The second data-processing system is a web-proxy that provides a web-proxy interface to the application hosted in the second domain. The second data-processing system can provide the web-proxy interface to many applications.

The solution disclosed above creates a new problem. Namely, how to communicate the signal to the first domain. This problem arises because the web-proxy typically routes the signals over the Internet and controlling the path of a signal over the Internet is problematic.

The illustrative embodiment of the invention solves this routing problem by establishing a tunnel from the first domain to the second data-processing system and designating the second data-processing system as a "tunnel gateway." A tunnel gateway routes the signal into a tunnel. The second domain therefore not only provides the web-proxy interface to the application, but also routes the signals into the tunnel and eventually through the firewall to the first domain.

Following are the some of the embodiments in which the above solution could be implemented. It will be clear to those skilled in the art, after reading this disclosure, how to make and use other alternative embodiments of the present invention.

In some embodiments, a first data-processing system is provided in the first domain and the tunnel is established from the first data-processing system to the second data-processing system. The second data-processing system provides a web-proxy interface to multiple applications and designating the second data-processing system as tunnel gateway enables routing the signals from these applications to the tunnel. Thereby, reducing the number of tunnels required from the first domain to the second domain for accessing multiple applications. In some embodiments, a number of tunnels terminate at the second data-processing system from a number of domains. The second data-processing system acts as a tunnel gateway for each of the tunnel terminating at the second data-processing system.

In some embodiments, authentication options are implemented with the second data-processing system. In some embodiments, the second data-processing system is provided with software and hardware to handle more than one tunnel from one or more than one domains.

Additionally, the illustrative embodiment provides the first data-processing system in the first domain. The tunnel is established from the first data-processing system to the second data-processing system through the firewall. And, this provides the opportunity to conduct an additional authentication at the first data-processing system. The first data-processing system transmits the signals to the appropriate destination within the first domain. In some embodiments, the first data-processing system provides a set of configuration credentials to the second data-processing system. This enables the second data-processing system to authenticate and transmit the signal at the appropriate destination through the appropriate tunnel. In some embodiments, the first data-processing system provides a set of configuration credentials to the application. This enables the application to generate the signals according to the set of configuration credentials. In some embodiments, the set of configuration credentials instructs the application to use the second data-processing system as a web-proxy interface. In some embodiments, the set of configuration credentials, instructs the application to use the second data-processing system as a tunnel gateway. In some embodiment, the application uses the set of configuration credentials to generate the signals that can be authenticated at the second data-processing system and at the first data-processing system.

In an embodiment of the present invention a method is provided. The method comprises: establishing a tunnel from a first data-processing system in a first domain through a firewall to a second data-processing system in a second domain, wherein the second data-processing system is configured to provide a web-proxy interface to an application hosted in the second domain; and receiving, at the first data-processing system, a signal from the application via the second data-processing system and the tunnel.

In another embodiment of the present invention another method is provided. The method comprises: establishing a tunnel from a first data-processing system in a first domain through a firewall to a second data-processing system in a second domain, wherein the second data-processing system is configured to provide a web-proxy interface to an application hosted in the second domain; and transmitting, to the first data-processing system, a signal from the application via the second data-processing system and the tunnel.

In a further embodiment of the present invention yet another method is provided. The method comprises: establishing a tunnel from a first data-processing system in a first domain through a firewall to a second data-processing system in a second domain, wherein the second data-processing system is configured to provide a web-proxy interface to an application hosted in the second domain; transmitting, to the first data-processing system, a signal from the application via the second data-processing system and the tunnel; and receiving the signal at the first data-processing system.

Among other advantages, embodiments of the invention provide an unprecedented degree of flexibility and control over communications between the application and the first domain. Compared to the prior art, far fewer tunnels and holes are required to support inter-domain communications for a given number of applications. Furthermore, the second data-processing system can serve a number of domains.

DETAILED DESCRIPTION

Figure 1:
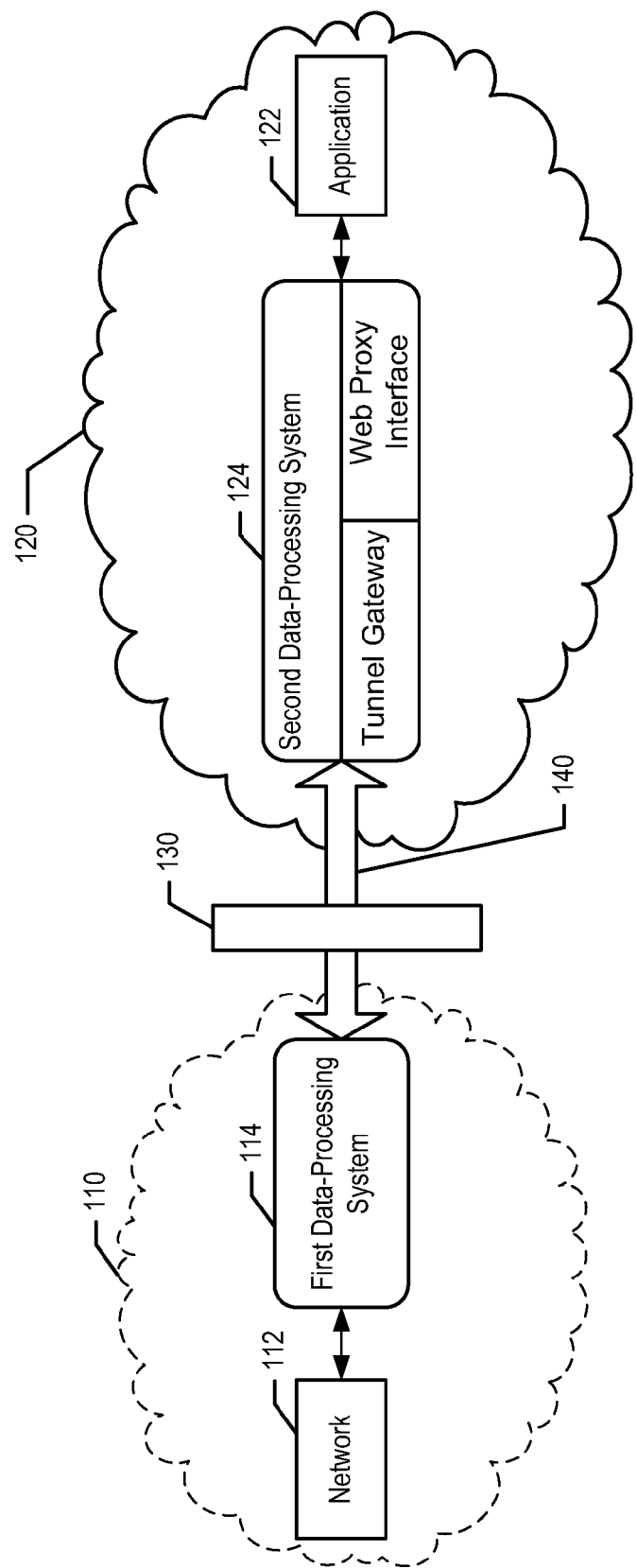
FIG. 1 depicts a schematic diagram of the salient components of the illustrative embodiment of the present invention.

FIG. 1 depicts a schematic diagram of the salient components of the illustrative embodiment of the present invention.

Telecommunications system 100 comprises: first domain 110, second domain 120, first data-processing system 114, network 112, firewall 130, tunnel 140, second data-processing system 124, and application 122. Although the illustrative embodiment comprises two domains and only one application, it will be clear to those skilled in the art, after reading this disclosure, how to make and use alternative embodiments of the present invention that comprise any number of domains and any number of applications in a domain.

First domain 110 comprises first data-processing system 114 and network 112. Network 112 is internal to first domain 110. In some embodiments, network 112 is a number of connected computers. In some additional embodiments, network 112 is a dedicated application, such as, without limitation, a private branch exchange. In yet some further embodiments, network 112 is an application. In some embodiments, network 112 hosts an application.

First data-processing system 114 comprises the hardware and software to request and accept two-way communications using tunnel 140. It will be clear to those skilled in the art, after reading this specification, how to make and use first data-processing system 114 to enable communication between second domain 120 and network 112. First data-processing system 114 further comprises the hardware and software to:

(1) create tunnel 140 through firewall 130 to second domain 120; and
(2) act as a proxy for network 112.

In some embodiments, first data-processing system 114 resides within network 112. The tasks performed at first domain 110 are described in detail below and in the accompanying figures.

Firewall 130 comprises hardware and software to prevent hackers from accessing the resources within first domain 110. It will be clear to those skilled in the art, after reading this specification, how to make and use firewall 130.

Second domain 120 comprises second data-processing system 124 and application 122. Second data-processing system 124 includes hardware and software required to establish tunnel 140 and enable communication between first domain 110 and second domain 120. Second data-processing system 124 is a web-proxy; that is, it provides a web-proxy interface to application 122. Second data-processing system 124 is also a tunnel gateway. This means that second data-processing system 124 receives signals from application 122 and transmits the signals to tunnel 140.

Second data-processing system 124 comprises hardware and software to determine whether the signals received from application 122 are legitimate signals and whether the signals should be transmitted to tunnel 140. In situations in which there are multiple tunnels that terminate at second data-processing system 124, second data-processing system 124 is provided with software and hardware to determine which of the tunnels should be used to transmit the signals. In some embodiments, second data-processing system 124 is controlled by an administrator of second domain 120. In some additional embodiments, second data-processing system 124 is controlled by an administrator of first domain 110. And in yet some further embodiments, second data-processing system 124 is controlled by both the administrator of first domain 110 and the administrator of second domain 120.

Second domain 120 hosts application 122, which is the application that first domain 110 accesses. In some embodiments, application 122 resides in second data-processing system 124. In some embodiments, application 122 accesses resources of first domain 110. Application 122 generates signals that are communicated to first domain 110 via second data-processing system 124 and tunnel 140 through firewall 130. Application 122 is provided with a set of configuration credentials that, in some embodiments, are included with the signals. In some embodiments, second data-processing system 124 and first data-processing system 114 use the set of configuration credentials to authenticate the signals.

Although the illustrative embodiment comprises two domains, two data-processing systems, one tunnel, one application and one firewall, it will be clear to those skilled in the art, after reading this disclosure, how to make and use alternative embodiments of the present invention in which any number of domains, data-processing systems, firewalls, and applications are involved.

Figure 2:
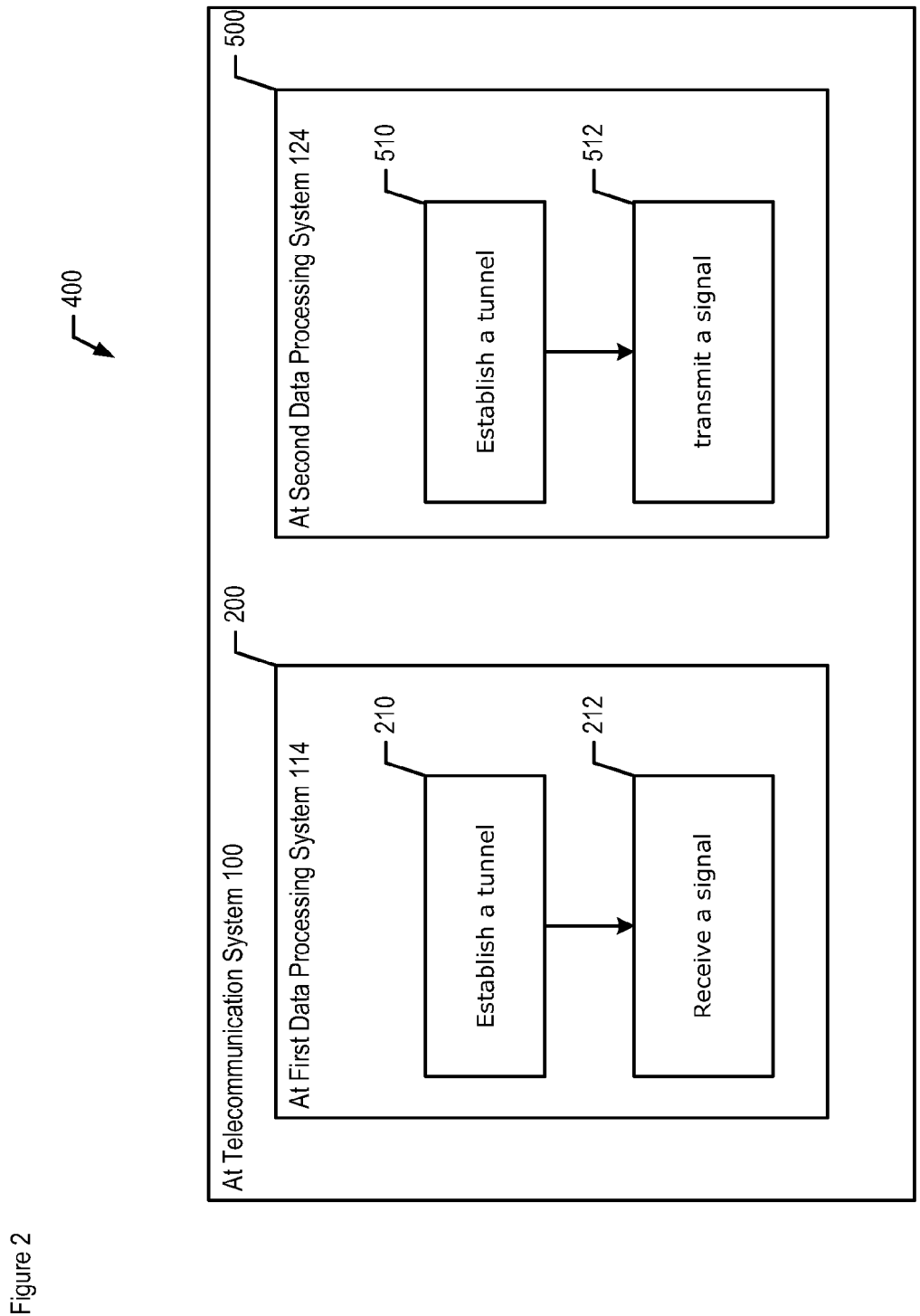
FIG. 2 depicts a method of the salient tasks associated with the operation of the illustrative embodiment at the telecommunications system.

FIG. 2 depicts a method 400, which comprises tasks that, in the illustrative embodiment, are performed at telecommunication system 100. Method 400 comprises method 200 and method 500.

Method 200. In some embodiments, method 200 is performed at first domain 110. In the illustrated embodiment, method 200 is performed at first data-processing system 114. Method 200 comprises tasks 210 and 212. At task 210, tunnel 140 is established. In the illustrative embodiment, tunnel 140 runs from first data-processing system 114 through firewall 130 to second data-processing system 124. In some embodiments, task 210 is initiated by network 112. In some embodiments, upon receipt of a request from network 112, first data-processing system 114 transmits a message to second data-processing system 124 to establish tunnel 140.

At task 212, first data-processing system 114 receives a signal from application 122 via second data-processing system 124 and tunnel 140. In some embodiments, second data-processing system 124 provides a web-proxy interface to application 122. In some other embodiments, second data-processing system 124 is a tunnel gateway. In some additional embodiments, second data-processing system 124 is both a web-proxy interface and a tunnel gateway.

Method 500. In some embodiments, method 500 is performed at second domain 110. In the illustrated embodiment, method 500 is performed at second data-processing system 124. Method 500 comprises tasks 510 and 512. At task 510, tunnel 140 is established. In the illustrative embodiment, tunnel 140 runs from first data-processing system 114 through firewall 130 to second data-processing system 124. In some embodiments, second data-processing system 124 establishes tunnel 140 upon receipt of the message from first data-processing system 114 to establish the tunnel.

At task 512, application 122 transmits the signal via second data-processing system 124 and tunnel 140. In some embodiments, second data-processing system 124 provides a web-proxy interface to application 122. In some other embodiments, second data-processing system 124 is a tunnel gateway. In some additional embodiments, second data-processing system is both a web-proxy interface and a tunnel gateway.

Figure 3:
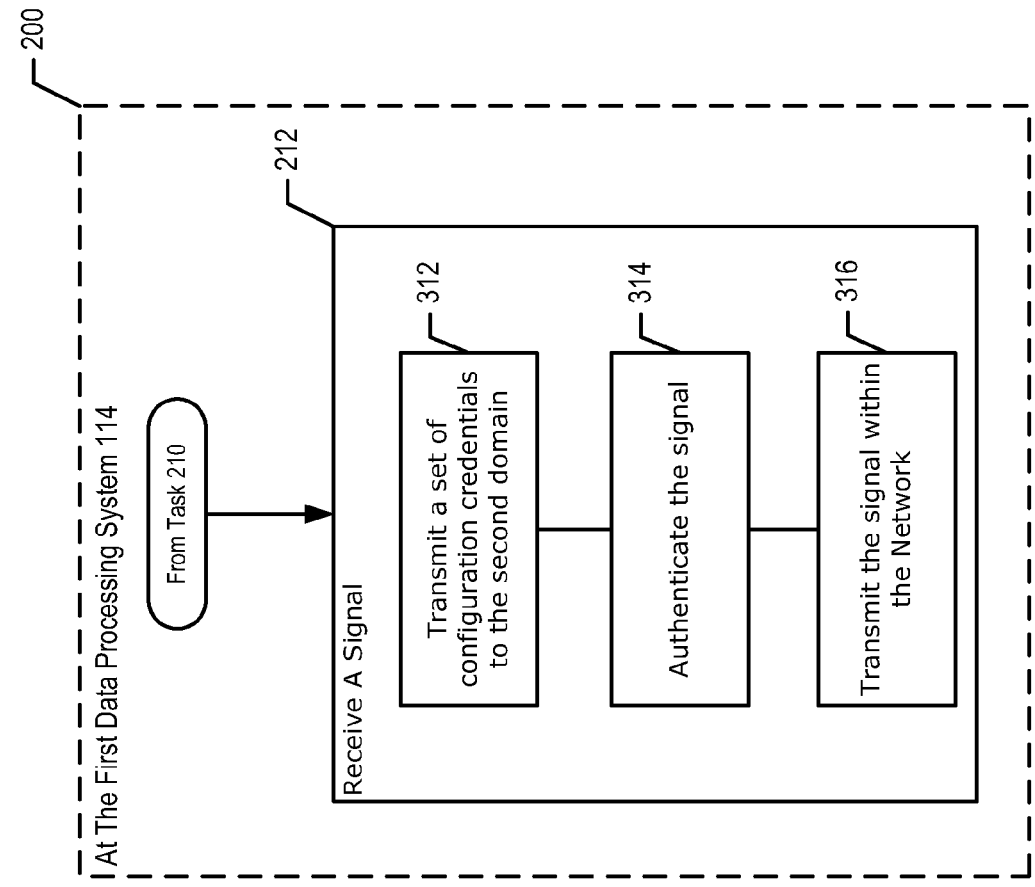
FIG. 3 depicts a method of the salient tasks associated with the operation of the illustrative embodiment at the first domain.

FIG. 3 depicts an embodiment of task 212. Task 212 incorporates subtasks 312, 314, and 316. In the illustrative embodiment, task 212 is performed at first data-processing system 114. At subtask 312, a set of configuration credentials are transmitted to second domain 120 from first domain 110. In some embodiments, the set of configuration credentials are transmitted to application 122. In some other embodiments, the set of configuration credentials are transmitted to second data-processing system 124. In some additional embodiments, the set of configuration credentials are transmitted to both application 122 and second data-processing system 124. In some embodiments, the set of configuration credentials includes instructions for application 122. Exemplary instructions include, without limitation, an instruction that: (1) second data-processing system 124 is a web-proxy interface and/or (2) second data-processing system 124 is a tunnel gateway.

In some embodiments, the set of configuration credentials include username and password, which application 122 includes with the signal. In some embodiments, the username and password is used by second data-processing system 124 and first data-processing system 114 to authenticate the signal. In some embodiments, the username and password is used by second data-processing system 124 to determine which tunnel should be used to transmit the signal.

In some embodiments, the set of configuration credentials are preserved at first data-processing system 114 for authenticating the signal there and routing it within first domain 110.

In the illustrative embodiment, first data-processing system 114 acquires one or more of the following items of information along with the set of configuration credentials:
   (1) information from network 112 regarding the application to be accessed;
   (2) information as to whether the application should be allowed to access the resources of first domain 110; and
   (3) authentication information from network 112.

In some embodiments, first data-processing system 114 generates the authentication information. In the embodiments where the authentication information is generated at first data-processing system 114, the authentication information is included with the set of configuration credentials and transmitted to second domain 120.

At subtask 314, first data-processing system 114 authenticates the signal. The signal is authenticated using the set of configuration credentials or using other authentication methods known to those skilled in the art.

At subtask 316, first data-processing system transmits the signal to network 112.

Figure 4:
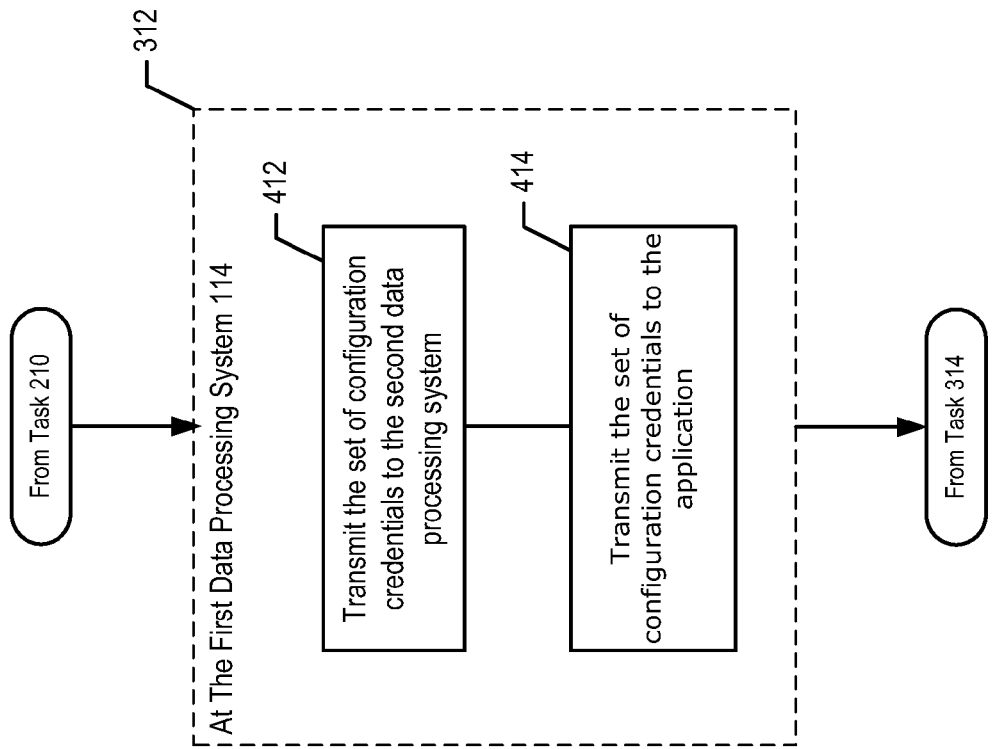
FIG. 4 depicts a method of the salient tasks associated with the operation of the illustrative embodiment at the first domain in more detail.

FIG. 4 depicts an embodiment of subtask 312. In the illustrative embodiment, subtask 312 includes subtasks 412 and 414. At subtask 412, the set of configuration credentials are transmitted from first data-processing system 114 to second data-processing system 124. Second data-processing system 124 uses the set of configuration credentials to authenticate the signal.

At subtask 414, the set of configuration credentials are transmitted to application 122. Application 122 uses this configuration credential to generate the signal according to the set of configuration credentials. Generating the signal according to the set of configuration credentials enables first data-processing system 114 and second data-processing system 124 to authenticate the signal. Also, generating the signal according to the set of configuration credentials facilitates routing the signal to the correct destination in first domain 110.

Figure 5:
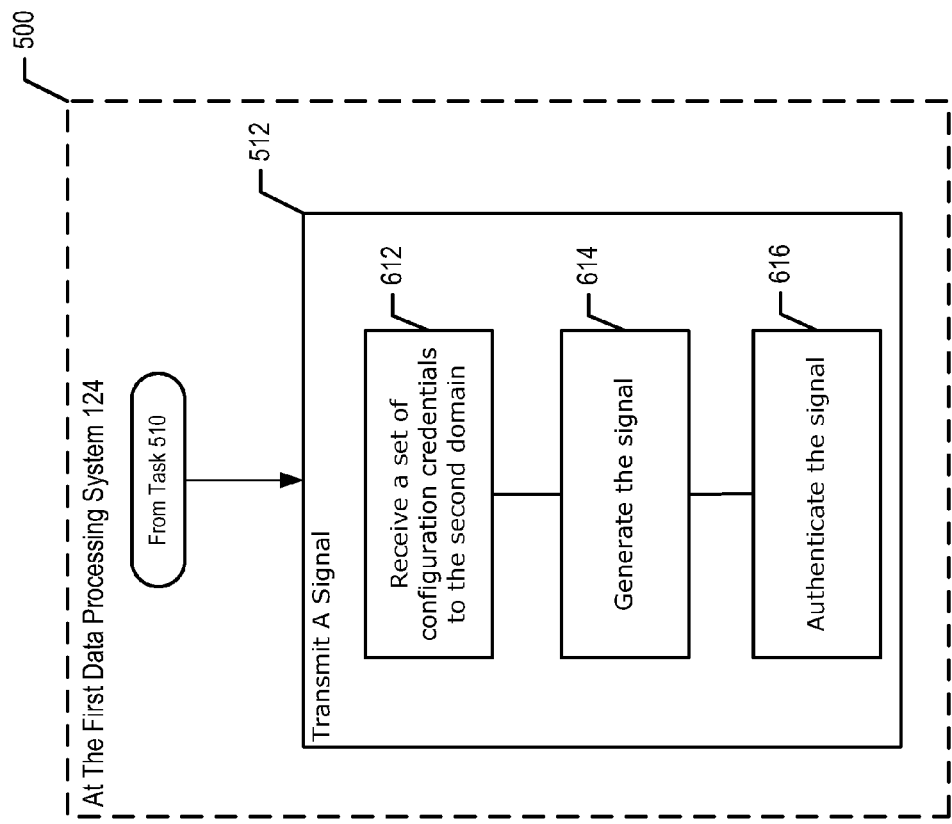
FIG. 5 depicts a method of the salient tasks associated with the operation of the illustrative embodiment at the second domain.

FIG. 5 depicts an embodiment of task 512. Task 512 incorporates subtasks 612, 614, and 616. In the illustrative embodiment, Task 512 is performed at second data-processing system 124. At subtask 612, a set of configuration credentials are received at second domain 120 from first domain 110. In some embodiments, second data-processing system 124 forwards the set of configuration credentials to application 122. In some embodiments, the set of configuration credentials include instructions for application 122. Exemplary instructions include, without limitation, an instruction that: (1) second data-processing system 124 is the web-proxy interface and/or (2) second data-processing system 124 is a tunnel gateway.

In some embodiments, the set of configuration credentials include username and password, which are included by application 122 with the signal. In some embodiments, the username and password is used by second data-processing system 124 and first data-processing system 114 to authenticate the signal. In some embodiments, the username and password is used by second data-processing system 124 to determine which tunnel should be used to transmit the signal.

In the illustrative embodiment, second data-processing system 124 receives one or more of the following items of information along with the set of configuration credentials:
(1) information regarding the application to be accessed;
(2) information as to whether the application should be allowed to access the resources of first domain 110; and
(3) authentication information.

At subtask 614, application 122 generates the signal. Application 122 generates the signal in accordance with the set of configuration credentials. In some embodiments, application 122 includes the username and password with the signal. In some embodiments, application 122 includes other authentication information as is instructed by the set of configuration credentials. In some embodiments, application 122 transmits the signal to second data-processing system 124 in accordance with the instructions included in the set of configuration credentials. In some embodiments, application 122 includes instructions with the signal to use second data-processing system 124 as a tunnel gateway. In some embodiments, application 122 uses second data-processing system 124 as a web-proxy interface. In some other embodiments, application 122 uses second data-processing system 124 as both a web-proxy interface and a tunnel gateway.

At subtask 616, second data-processing system 124 authenticates the signal. The signal is authenticated using the set of configuration credentials or via other authentication methods as are known to those skilled in the art.

Figure 6:
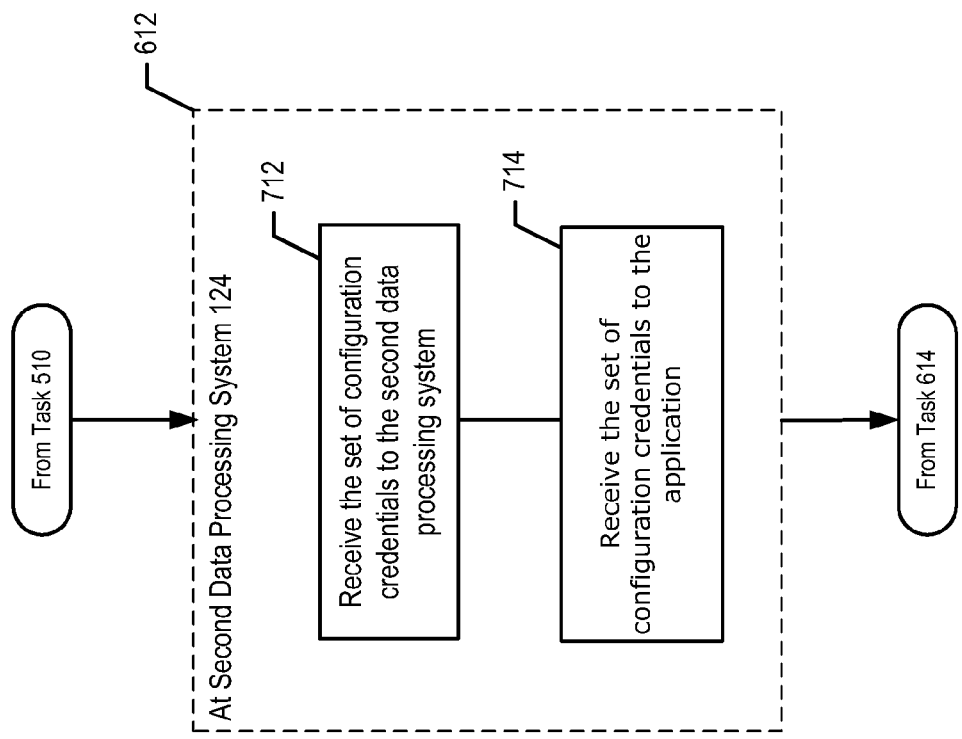
FIG. 6 depicts a method of the salient task associated with the operation of the illustrative embodiment at the second domain in more detail.

FIG. 6 depicts an embodiment of subtask 612. In the illustrative embodiment, subtask 612 includes subtasks 712 and 714. At subtask 712, the set of configuration credentials is received at second data-processing system 124. Second data-processing system 124 uses the set of configuration credentials to authenticate the signal. In some embodiments, second data-processing system 124 uses the username and password included in the set of confidential credentials for authenticating the signal. In some embodiments, second data-processing system 124 uses the configuration credentials to forward the signal to an appropriate tunnel.

At subtask 714, the set of configuration credentials are received at application 122. In the illustrative embodiment, application 122 generates the signal in accordance with the set of configuration credentials. This enables first data-processing system 114 and second data-processing system 124 to authenticate the signal according to the set configuration credentials. Also, generating the signal according to the set of configuration credentials enables first data-processing system 114 to route the signal to the correct destination in first domain 110. In some embodiments, the set of configuration credentials includes instructions for application 122. In some embodiment, the instructions include an instruction to use second data-processing system 124 as a web-proxy interface. In some other embodiments, the instructions include an instruction to use second data-processing system 124 as a tunnel gateway. In some further embodiments, the instructions include an instruction to use second data-processing system 124 as both a web-proxy interface and a tunnel gateway.

Figure 7:
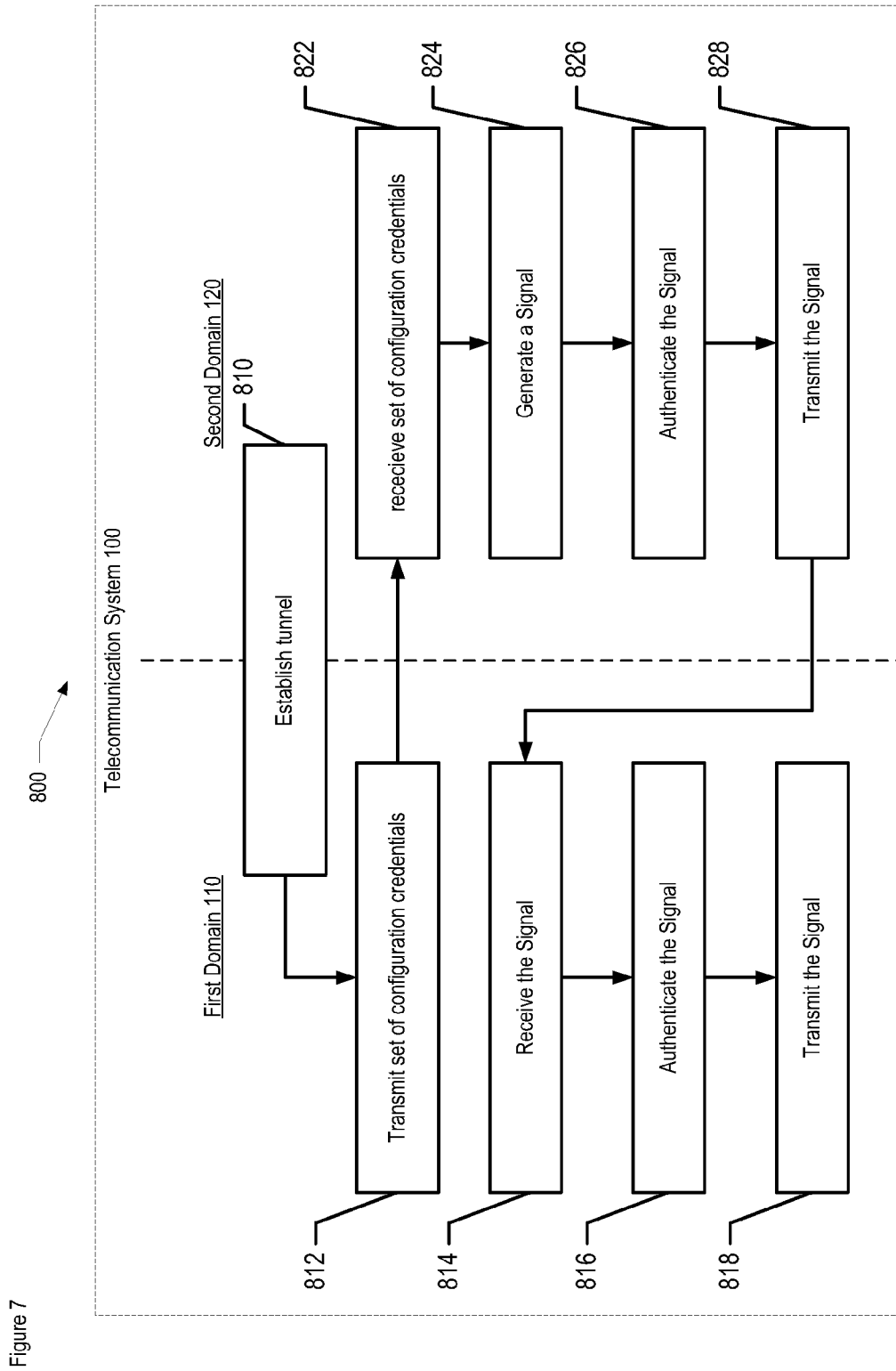
FIG. 7 depicts a method of the salient task associated with the operation of an illustrative embodiment of the present invention.

FIG. 7 depicts an embodiment 800 of the present invention. Method 800 is an alternate embodiment of method 400 of FIG. 2. Method 800 is performed at telecommunication system 100. At task 810, tunnel 140 is established from first data-processing system 114 through firewall 130 to second data-processing system 124. Second data-processing system 124 is configured to provide a web-proxy interface to application 122, which is hosted in second domain 120. In some embodiments, second data-processing system 124 provides a web-proxy interface to application 122. In some other embodiments, second data-processing system 124 is a tunnel gateway. In some embodiments, second data-processing system 124 is both a web-proxy interface and a tunnel gateway.

At task 812, a set of configuration credentials is transmitted from first domain 110 to second domain 120. In some embodiments, the set of configuration credentials are transmitted from outside of first domain 110. In some embodiments, the set of configuration credentials are transmitted via tunnel 140. In some other embodiments, the set of configuration credentials are transmitted via some other route. In some embodiments, the set of configuration credentials are transmitted to application 122. In some other embodiments, the set of configuration credentials are transmitted to second data-processing system 124. In some other embodiments, the set of configuration credentials are transmitted to both application 122 and second data-processing system 124. In some embodiments, the set of configuration credentials includes instructions for application 122. Exemplary instructions include, without limitation, an instruction that: (1) second data-processing system 124 is the web-proxy interface and/or (2) second data-processing system 124 is a tunnel gateway.

In some embodiments, the set of configuration credentials include username and password, which application 122 includes with the signal. In some embodiments, the username and password is used by second data-processing system 124 and first data-processing system 114 as a measure to authenticate the signal. In some embodiments, the username and password is used by second data-processing system to determine which tunnel should be used to transmit the signal.

In some embodiments, the set of configuration credentials are preserved at first data-processing system 114. In some embodiments, the preserved set of configuration credentials is used authenticating the signal. In some embodiments, the preserved set of configuration credentials is used for routing the signal within first domain 110.

In the illustrative embodiment, first data-processing system 114 acquires one or more of the following items of information along with the set of configuration credentials:
(1) information from network 112 regarding the application to be accessed;
(2) information as to whether the application should be allowed to access the resources of first domain 110; and
(3) authentication information from network 112.

In some embodiments, first data-processing system 114 generates the authentication information. In the embodiments where the authentication information is generated at first data-processing system 114, the authentication information is included with the set of configuration credentials and transmitted to second domain 120.

At task 822, the set of configuration credentials is received at second domain 120. In some embodiments, the set of configuration credentials is received at second data-processing system 124. In some other embodiments, the set of configuration credentials is received at application 122. In some embodiments, the set of configuration credentials are received at both second data-processing system 124 and application 122. In some embodiments, second data-processing system 124 forwards the set of configuration credentials to application 122. In some embodiments, the set of configuration credentials include instructions for application 122. Exemplary instructions include, without limitation, an instruction that: (1) second data-processing system 124 is a web-proxy interface and/or (2) second data-processing system 124 is a tunnel gateway. In some embodiments, the set of configuration credentials include username and password, which are included by application 122 with the signal. In some embodiments, the username and password is used by second data-processing system 124 and first data-processing system 114 as a measure to authenticate the signal. In some embodiments, the username and password is used by second data-processing system to determine which tunnel should be used to transmit the signal.

In the illustrative embodiment, second data-processing system 124 receives one or more of the following items of information along with the set of configuration credentials:
(1) information regarding the application to be accessed;
(2) information as to whether the application should be allowed to access the resources of first domain 110; and
(3) authentication information.

At task 824, application 122 generates the signal. Application 122 generates the signal in accordance with the set of configuration credentials. In some embodiments, application 122 includes the username and password with the signal. In some embodiments, application 122 includes other authentication information as instructed by the set of configuration credentials. In some embodiments, application 122 transmits the signal to the second data-processing system 124 in accordance with the instruction included in the set of set of configuration credentials. In some embodiments, application 122 includes instruction with the signal to use second data-processing system 124 as tunnel gateway. In some embodiments, application 122 uses second data-processing system 124 as a web-proxy interface. In some embodiments, application 122 uses second data-processing system 124 as a web-proxy interface as well as a tunnel gateway for the signal. In some other embodiments, the signal includes authentication information. Application 122 transmits the signal to second data-processing system 124.

At task 826, second data-processing system 124 authenticates the signal. The signal is authenticated according to the set of configuration credentials or via other authentication methods as are known to those skilled in the art. At task 828, second data-processing system transmits the signal to first data-processing system 114 via tunnel 140 through firewall 130. At task 814, the signal is received at first domain 110. In some embodiments, the signal is received at first data-processing system 114. At task 816, first data-processing system authenticates the signal. In some embodiments, the signal is authenticated using the set of configuration credentials and the authenticating information included in the signal, alternatively first data-processing system 114 employs any other authentication techniques that are known to those skilled in the art. At task 818, first data-processing system 114 transmits the signal to network 112.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    establishing a tunnel from a first data-processing system in a first domain through a firewall to a second data-processing system in a second domain, wherein the second data-processing system is configured to provide a web-proxy interface to a plurality of applications hosted in the second domain by use of the tunnel;
    transmitting a set of configuration credentials from the first data-processing system in the first domain to the second domain; and
    receiving, at the first data-processing system, a signal from an application of the plurality of applications via the second data-processing system and the tunnel, wherein the second data-processing system authenticates the signal according to the set of configuration credentials, and wherein the application generates the signal according to the set of configuration credentials to enable the first data-processing system to route the signal to the correct destination in the first domain.

2. The method of claim 1 further comprises authenticating the signal at the first data-processing system.

3. The method of claim 1 further comprises transmitting the signal from the first data-processing system to within the first domain.

4. A method comprising:
    establishing a tunnel from a first data-processing system in a first domain through a firewall to a second data-processing system in a second domain, wherein the second data-processing system is configured to provide a web-proxy interface to a plurality of applications hosted in the second domain by use of the tunnel;
    receiving at the second data-processing system in the second domain, from the first data-processing system in the first domain, a set of configuration credentials;
    generating a signal at an application of the plurality of applications, wherein the application generates the signal according to the set of configuration credentials to enable the first data-processing system to route the signal to the correct destination in the first domain;
    authenticating the signal at the second data-processing system according to the set of configuration credentials; and
    transmitting, to the first data-processing system, the signal via the second data-processing system and the tunnel.

5. The method of claim 4 further comprises authenticating the signal at the second data-processing system.

6. A method comprising:
    establishing a tunnel from a first data-processing system in a first domain through a firewall to a second data-processing system in a second domain, wherein the second data-processing system is configured to provide a web-proxy interface to a plurality of applications hosted in the second domain by use of the tunnel;
    transmitting a set of configuration credentials from the first data-processing system in the first domain to the second data-processing system in the second domain;
    receiving the set of configuration credentials at the second data-processing system in the second domain;
    receiving the set of configuration credentials at an application of the plurality of applications;
    generating, at the application, a signal according to the set of configuration credentials in order to enable the first data-processing system to route the signal to the correct destination in the first domain;
    authenticating, at the second data-processing system, the signal according to the set of configuration credentials;
    transmitting, to the first data-processing system, the signal via the second data-processing system and the tunnel; and
    receiving the signal at the first data-processing system.

7. The method of claim 6 further comprises authenticating the signal at the first data-processing system.

8. The method of claim 6 further comprises transmitting the signal from the first data-processing system to within the first domain.

9. The method of claim 6 further comprises authenticating the signal at the second data-processing system.

* * * * *